United States Patent [19]

Lautenschläger

[11] Patent Number: 5,163,774

[45] Date of Patent: Nov. 17, 1992

[54] HARDWARE DEVICE FOR MOUNTING DRAWER FRONTS

[75] Inventor: Horst Lautenschläger, Reinheim, Fed. Rep. of Germany

[73] Assignee: Karl Lautenschläger GmbH & Co. KG, Reinheim, Fed. Rep. of Germany

[21] Appl. No.: 580,135

[22] Filed: Sep. 10, 1990

[30] Foreign Application Priority Data

Sep. 19, 1989 [DE] Fed. Rep. of Germany ....... 3931155

[51] Int. Cl.⁵ .................................................. B25G 3/00
[52] U.S. Cl. .................... 403/245; 403/406.1; 312/330.1
[58] Field of Search ............. 403/245, 246, 406.1; 312/330.1, 263

[56] References Cited

U.S. PATENT DOCUMENTS 4,705,328 11/1987 Rock et al. .................. 312/263 X
4,846,538 7/1989 Rock et al. .................. 312/330.1 X

FOREIGN PATENT DOCUMENTS 8905109 6/1989 European Pat. Off. ........... 312/263

Primary Examiner—Andrew V. Kundrat

[57] ABSTRACT

Hardware device for fastening the front facing of a drawer to its sides, having a mounting member which can be attached to the front facing, and a coupling arm which can be joined releasably to the mounting member and can be fastened adjustably to or in the corresponding drawer side. The mounting member has a tongue protruding essentially at right angles from the inside face of the front facing, while the coupling piece, configured as an elongated, flat coupling arm extending with its flat sides substantially parallel to the corresponding drawer side has a recess with an opening in its end confronting the front facing, into which opening the tongue can be inserted. In the recess on the one hand, and on the tongue on the other, cooperating releasable fastening means are provided which selectively join the tongue to the coupling arm.

12 Claims, 5 Drawing Sheets

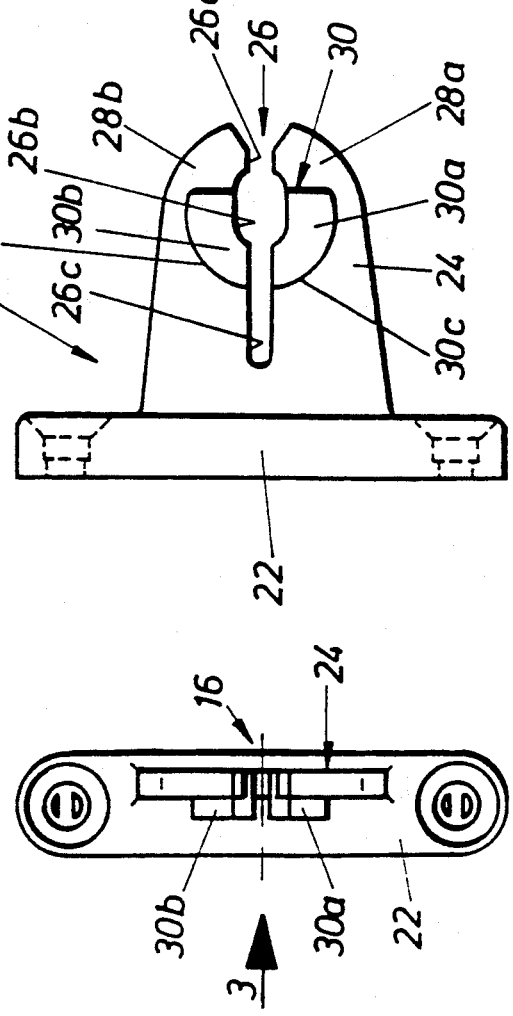
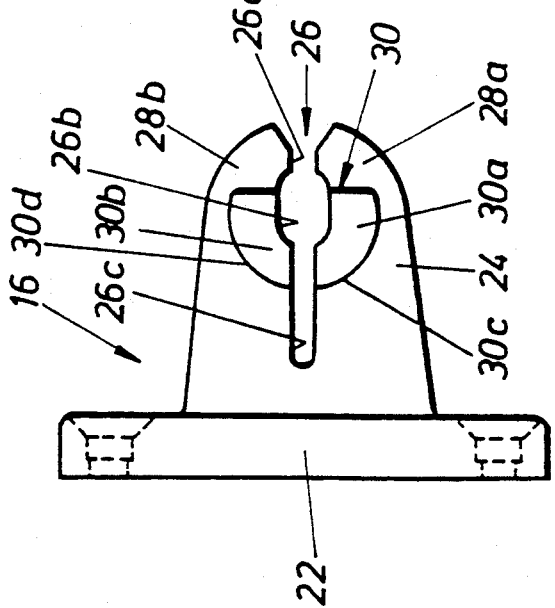
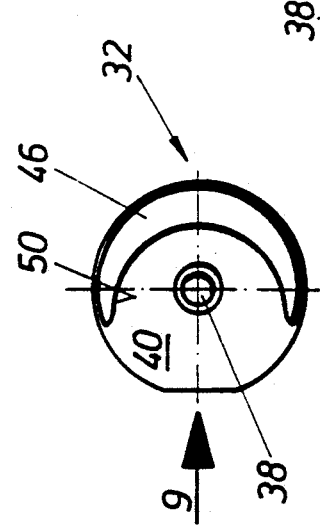
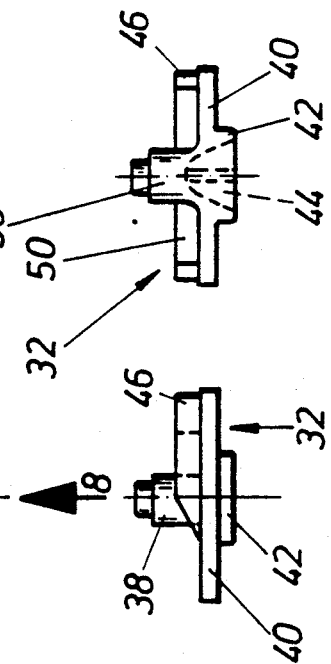

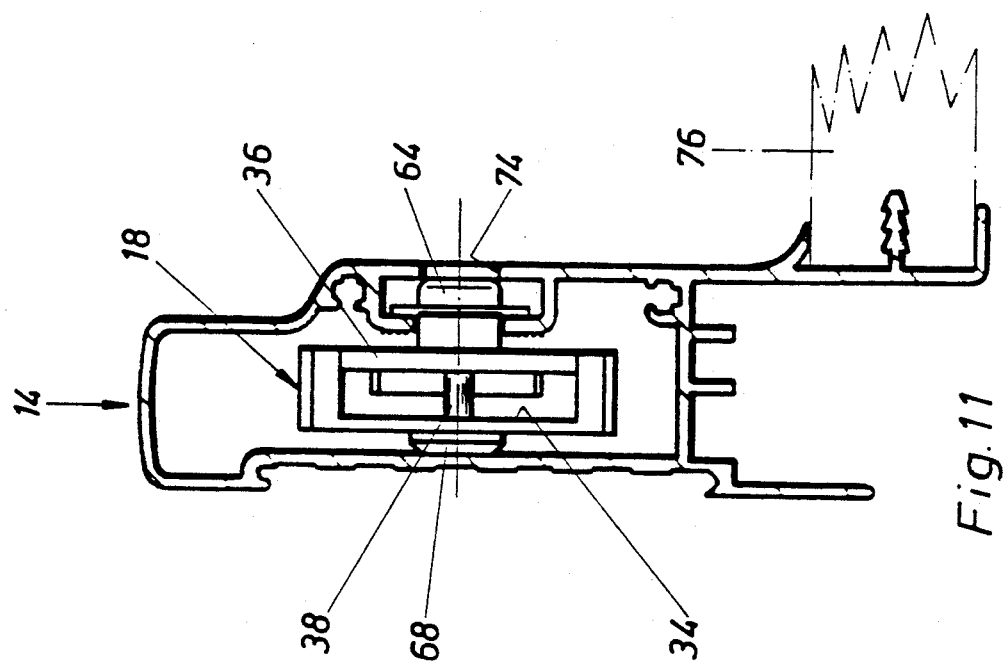
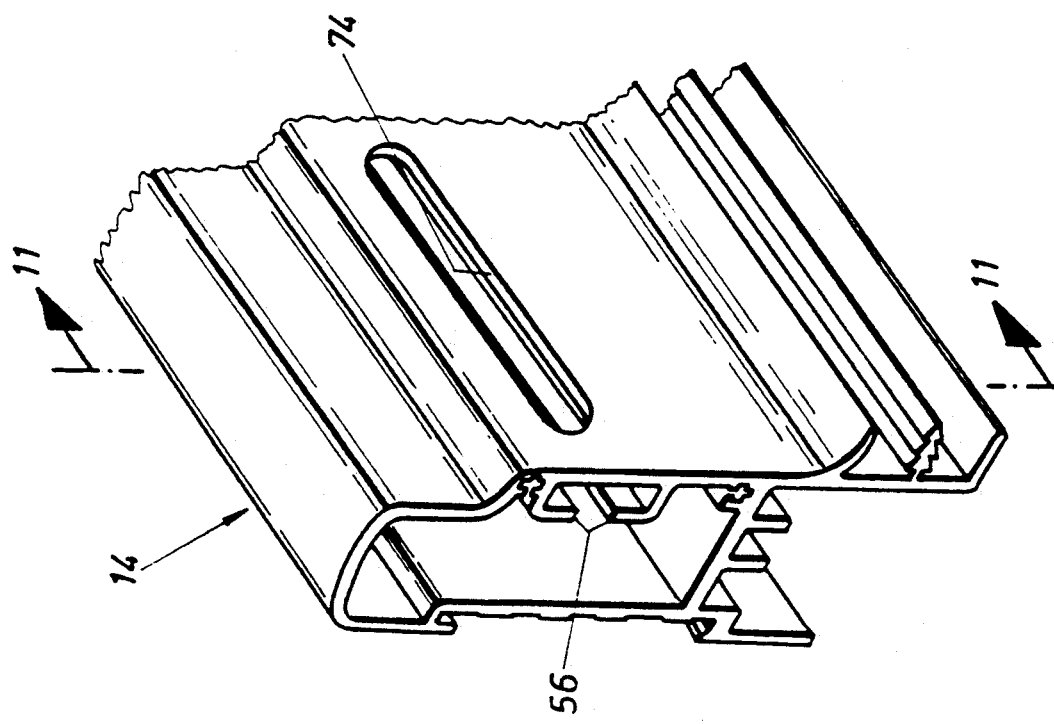

HARDWARE DEVICE FOR MOUNTING DRAWER FRONTS

BACKGROUND OF THE INVENTION

The invention relates to a hardware device for fastening the front of a drawer to the drawer sides, having a fastening part which can be attached to the front and a mounting member which can be releasably joined to the fastening part and can be adjustably fastened on or in the corresponding drawer side.

Drawers today are mostly provided with drawer facings which overlap the actual drawer box in height and in width and thus, when the drawer is fully closed into the corresponding cabinet, the facings abut against the front edges of the sides of the carcase and, in the case of the top and bottom drawers of a cabinet, they also abut against the top and bottom front edges of the carcase walls. The problem arises that the drawer facings have to be aligned with the facings of drawers that are adjacent above or below or on the side or sides such that, when they are closed, they will have a precise and aesthetically satisfactory alignment. As long as the drawer facings were mounted on the actual front of the drawer box, such alignment could be accomplished with relative ease by making the holes for the screws driven through the front of the box into the drawer facing from the inside of the drawer larger than the shank diameter of the screws, so as to permit the front facing to be shifted in all directions within the space provided by the oversize holes while the screws were loosened. After the alignment was made, the facings were then affixed to the drawer box front by tightening the screws. Lately, however, drawers are increasingly being made without a fixed box front, i.e., the front facings are simultaneously the drawer fronts and therefore they must be joined tightly to the drawer box in order to stabilize the front part of the drawer. For this purpose hardware devices been developed which additionally perform the task of mounting the front end of the runner rail of the drawer guide which holds the drawer in the carcase (German Federal Disclosure Document 36 32 442). These mounting devices are disposed under the bottom of the drawer on the inside face of the drawer sides which downwardly overlap the drawer bottom. In order to fasten the drawer facing sufficiently rigidly to the drawer sides, however, at least in the case of drawers of great vertical depth, additional fastening means in the nature of corner fasteners must be provided above the bottom level which must also permit an adjustment of the front facings and, as regards appearance, they must be as inconspicuous as possible. In the case of drawers recently used for certain applications, having sides made of plastic or metal structural shapes, door-front mounting hardware to be disposed inside of the hollow structural shapes of the drawer sides has been developed (e.g., European Patent disclosure document 0 267 477), in which a mounting member is fastened to the front facing, which can be hung into a leaf spring which in turn is disposed for adjustment in level and in the direction of drawer movement in a supporting piece disposed in the interior of the hollow structural shape. For the transverse adjustment of the front facing, the mounting member is furthermore itself so divided that these parts are adjustable transversely relative to one another. These known hardware devices are of relatively complex construction and are accordingly expensive to manufacture. Furthermore, the so-called mounting piece has to be configured to match the interior cross section of the hollow structural shape, i.e., at least the mounting piece has to be made to fit different drawer side structural shapes.

The invention is addressed to the problem of devising hardware for mounting the front facings of drawers, which will be of relatively simple construction and can be disposed directly inside of hollow structural drawer-side shapes or in housings to be mounted separately on the side walls or to be recessed into them, and at the same time will permit the drawer facings to be fastened rigidly to the drawer sides, but so as to be adjustable in the necessary coordinate directions.

THE INVENTION

Setting out from a hardware device of the kind described above, this problem is solved in accordance with the invention by the fact that the mounting member has a tongue projecting substantially at right angles from the inside surface of the front facing, that the mounting member is in the form of an elongated flat coupling arm which can be mounted with its flat sides running substantially parallel to the corresponding drawer side, and in whose end pointing toward the front facing a recess is provided into which the tongue can be inserted, and that in the recess and on the tongue there are provided cooperating releasable fastening means joining the tongue selectively with the coupling arm.

In an advantageous further development of the invention, the tongue has, in its free end which can be inserted into the recess in the coupling arm, an open-ended longitudinal slot which divides the tongue into two resilient sections and, upon insertion into the recess in the coupling arm, can be pushed over a transverse shaft provided therein. At the same time the configuration is best made such that the slot has in the area of its mouth a width that is less than the diameter of the shaft, followed by an area having a width that corresponds substantially to the diameter of the shaft. Upon the insertion of the tongue into the coupling arm, therefore, first the shaft snaps into the longitudinal slot, thereby joining the drawer facing at first loosely to the drawer sides, and consequently the necessary adjustments can be performed.

The shaft is advantageously journaled in bores in the coupling arm walls that define the recess, at least the journal on the inside of the drawer being a through-bore out of which the associated shaft end provided with means for engagement by a turning tool protrudes or in which the face end of this shaft is accessible, and the shaft has in the recess a locking cam with an arcuate locking surface running spirally or excentrically with respect to its axis of rotation, with which a locking engagement surface provided on the tongue is associated, and the locking surface of the locking cam can be brought into engagement by rotating the shaft.

The locking cam then advantageously has a thin plate affixed to the shaft, running at right angles to the axis of rotation of the shaft, and mounted within the recess beside the inserted tongue, and from its marginal area rises a bolster arcuately curved in plan, extending over a portion of the circumference, whose boundary surface facing the shaft forms the locking surface, the lock engaging surface then being formed by the outer defining surface of a projection protruding from the tongue toward the base plate of the locking cam.

In an advantageous further development of the invention, the means for the releasable fixation are provided in or on the associated drawer side at selectable distances from the end face of this drawer side pointing toward the front facing, at the end of the coupling arm remote from the front facing, preferably in the form of a transversely disposed threaded bore in which a screw is driven whose shaft passes through a slot substantially parallel to the drawer bottom in a wall of the drawer side or in a housing accommodating the coupling arm which can be fastened to or in the drawer side. The head of the screw, which is exposed on the outside of the slot, can therefore be selectively loosened by backing out the screw, in which case a longitudinal displacement of the coupling arm within the given length of the slot is possible, or by turning the screw in it can be brought into clamping contact with the outside walls laterally defining the slot, whereby the coupling arm can then be fastened in a selectable position permitting the tongue to be drawn tight and thus tightening the front facing of the drawer.

A configuration is then advantageous in which ribs running one on each side of the threaded bore at substantially right angles to the length of the coupling arm project from the flat side of the coupling arm facing the wall provided with the slot parallel to the drawer bottom, the free edge of this rib facing the wall being sharpened to a cutting edge. When the screw is tightened, the cutting edge of the rib then digs into the wall defining the slot and secures the coupling arm against longitudinal displacement.

Ahead of and/or behind the transverse threaded bore it is recommendable to have at least one projection on the flat side of the coupling arm facing the slot, whose width measured transversely of the projection is slightly smaller than the width of the slot. When the screw is loosened, this projection or these projections will then prevent the coupling arm from tilting under its own weight or due to improper handling, to such an extent that the tongue can no longer be introduced or can be introduced only with difficulty into the recess in the coupling arm.

For the purpose of the adjustment of the height of the front facing, a through-bore of circular cross section is provided, in a further development of the invention, in the middle part of the coupling arm, in which a cam is journaled from whose end surface facing the slot a pivot projects which passes through the slot, whose diameter corresponds approximately to the width of the slot, and whose axis of rotation is parallel to the central axis of the cam, but is offset from the central axis of the cam by the amount of the excentricity. By rotating the pivot passing through the slot, the cam too is rotated, in which case, however, regardless of the direction of rotation, the result is a raising or lowering of the coupling arm, which produces the desired upward or downward shift of the front facing relative to the associated drawer side. In the outwardly exposed face of the pivot a tool engaging recess, e.g., a screwdriver slot, is best again provided, which permits the pivot, and therefore the cam, to be turned.

To be able to shift the front facing in the horizontal direction a configuration is recommendable in which the coupling arm contains a threaded transverse bore—but one offset from the bore of circular cross section accommodating the cam—whose diameter is greater than the width of the slot, a threaded spindle being screwed through this threaded transverse bore, its length being approximately equal to the distance between the housing walls or the wall of the hollow structural shape of the drawer side, and a tool engaging recess being provided in the end of the threaded spindle facing the slot, which is accessible through the slot. The threaded spindle therefore thrusts at both ends against the confronting inside surfaces of the walls defining the coupling arm. When this threaded spindle is rotated by means of a suitable tool introduced through the slot, the position of the threaded spindle in the coupling arm varies. Since the threaded spindle is unable to undergo any lateral shifting due to the abutment of its end, the coupling arm, and thus also the front facing born by it, is shifted in the transverse direction.

BRIEF DESCRIPTION OF THE DRAWINGS

The invention is further explained in the following description, in connection with the drawing wherein:

FIG. 2 is a view of the mounting member of the device according to the invention, which can be attached to the front facing, as seen in the direction of the arrow 2 in FIG. 1.

FIG. 3 is a view of the mounting member as seen in the direction of the arrow 3 in FIG. 2.

FIG. 7 is a top view of a locking cam which is journaled in a recess in the coupling arm and which has an opening opposite the front facing.

FIGS. 8 and 9 are views of the locking cam seen in the direction of the arrows 8 and 9 respectively in FIG. 7.

FIG. 10 is a perspective view of the end confronting the front facing, of a hollow metal structural shape manufactured by the extrusion process for a drawer side.

FIG. 11 is a sectional view through the hollow structural shape shown in FIG. 10, in which the coupling arm of the device according to the invention is additionally shown, but not in section.

DESCRIPTION OF PREFERRED EMBODIMENTS

Figure 1:
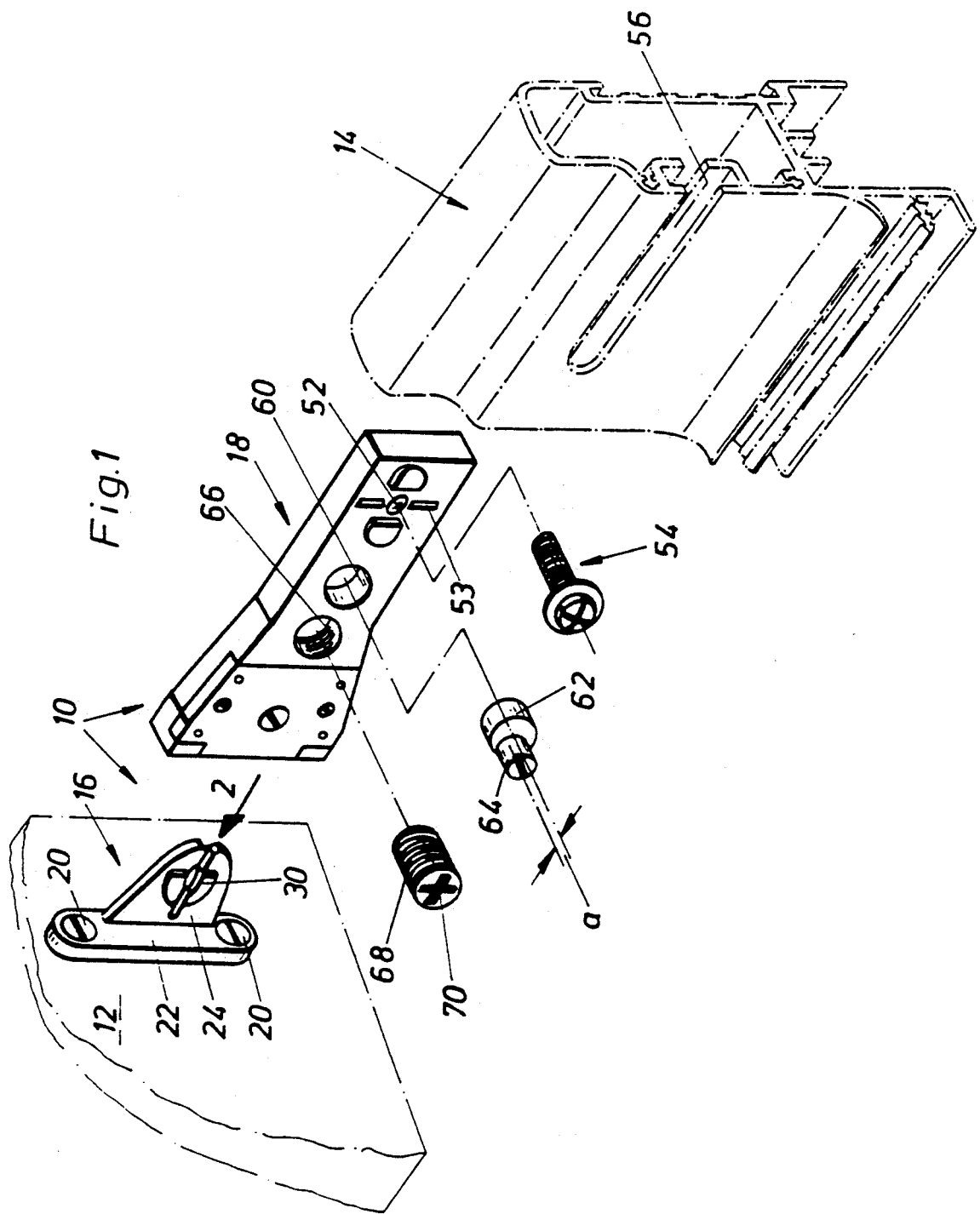
FIG. 1 is a perspective, exploded view in which a corner section of the front facing and the front part of the corresponding drawer side are indicated only in broken lines.

In FIG. 1 there is shown an embodiment, identified as a whole by 10, of a mounting device in accordance with the invention, showing only the corner area of the front facing 12 to be fastened to the drawer, and only the area of the attachment of the drawer side 14 formed, in this case, of an extruded hollow aluminum piece both being represented by broken lines. Since the hollow shape forming the drawer side offers sufficient space inside of it, no special housing is needed in the present case for the device 10. In other cases, however, a housing of this kind may be required for fastening on the drawer side or in a recess therein, as it will be clear later on in connection with the embodiment described by FIGS. 12 and 13.

The device 10 has a mounting member 16 which can be fastened to the inside face of the front facing 12 that is to be installed (FIGS. 1, 2 and 3), plus a coupling arm 18 which can be adjustably fastened on or, in the present case, in the side 14 of the drawer.

The mounting member 16 is composed of a mounting flange 22 which can be fastened with screws 20 on the inside face of the front facing, and of a flat tongue 24 protruding approximately from the center of, and at right angles to, the inside surface. The mounting member 16 is attached to the inside surface of the front facing such that the flat sides of the tongue 24 are at right angles to the inside surface of the front facing and to the drawer bottom (not shown). The tongue 24 is divided at its free end by an open-ended longitudinal slot 26 into two resilient tongue sections 28a and 28b, while portion 26a of the longitudinal slot 26 adjoining the mouth of the slot is narrower than the adjacent portion 26b of the longitudinal slot. Slot section 26b can then continue in an additional slot section 26c of again reduced width toward the mounting flange 22, the total length of the slot 26 determining the length of the tongue sections 28a, 28b, formed from the tongue 24, and the resistance which the resilient tongue sections offer to a resilient flexure in the sense of a widening of the slot 26.

From one side of the tongue 24 a low projection 30 of circular plan extends from the vicinity of the end of the tongue which is there divided into the two tongue sections 28a, 28b, and is divided by slot 26 into two partial projections 30a, 30b. The portions 30c and 30d of the cylindrical circumferential surface of the projection 30 facing away from the free end of the tongue 24 together form a locking engagement surface for a locking cam 32, which is disposed in the coupling arm 18, and which will be described in detail below in connection with FIGS. 4 to 6 and 7 to 9. For the sake of completeness, it is to be noted that the tongue 24 of the mounting member 16 can also be hinged on the mounting flange 22 so as to be able to fold down 90°, so that the tongues of mounting members 16 can be folded back against the inner faces of the front facings for compact packaging.

The elongated, flat coupling arm 18, injection molded from plastic, has at its front end, which faces the front facing and is wider than its middle and rearward area, a recess 34 which is open at the end face of the coupling arm pointing toward the front facing and is so long lengthwise of the coupling arm that the tongue 24 of the mounting member 16 can be completely inserted into it. In the recess 34, which is closed on the one flat side by a thin plate 36 made separately and then fastened on the coupling arm, the above-mentioned locking cam 32 is rotatably mounted. As it can be seen in FIGS. 7 to 9, this locking cam, manufactured in one piece of metal, has for this purpose a shaft 38 serving as a pivot for the locking cam, which protrudes centrally from a thin, circular lock plate 40 and whose free end is journaled in a bore in the wall of the mounting arm 18 that terminates the recess 34. A shaft 42 of slightly larger diameter projects from the opposite side of the lock plate 40 and is journaled in a bore in the plate 36 closing the recess, the lock plate 40 being disposed within a corresponding counterbore in the inner side of the plate 36. In the freely accessible face of the shaft 42 is a recess for engagement by a turning tool, which in the present case is a cross slot 44 which permits the locking cam 32 to be rotated by means of a cross-point screwdriver. In the circumferential area of the lock plate 40, the actual, raised locking bolster 46 projects, which can be brought into engagement with the lock engaging surface of projection 30 of the tongue 24, and which has on its inner surface facing the shaft 38 a locking surface 50 running spirally or excentrically with respect to the longitudinal central axis of the shaft 38.

Figure 6:
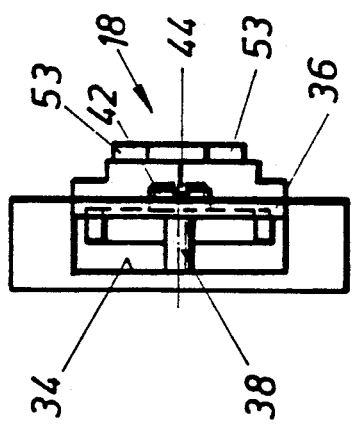
FIG. 6 is a view of the coupling arm as seen in the direction of arrow 6 in FIG. 4.
Figure 4:
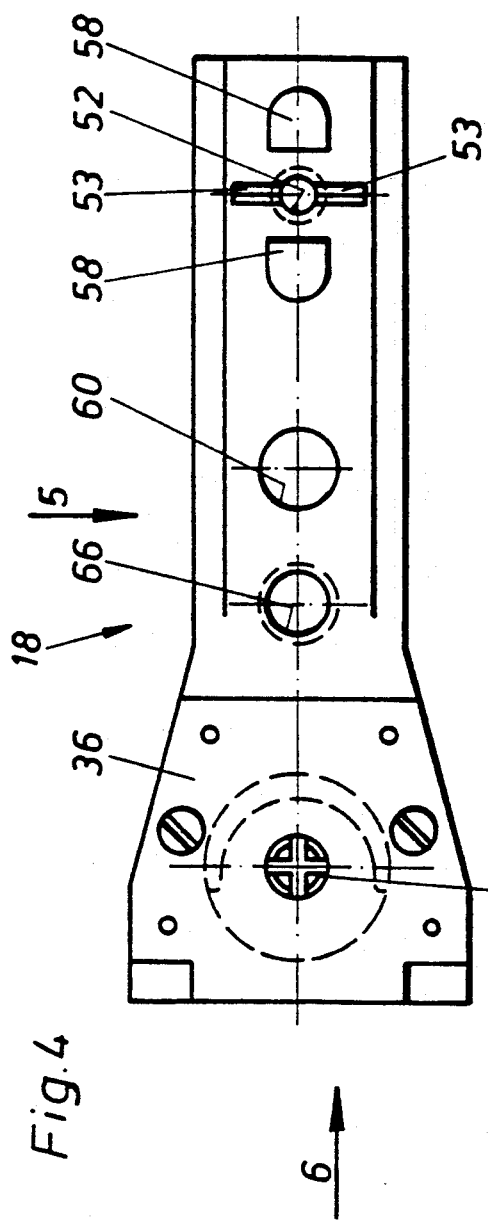
FIG. 4 is a view of the coupling arm of the device according to the invention.
Figure 5:
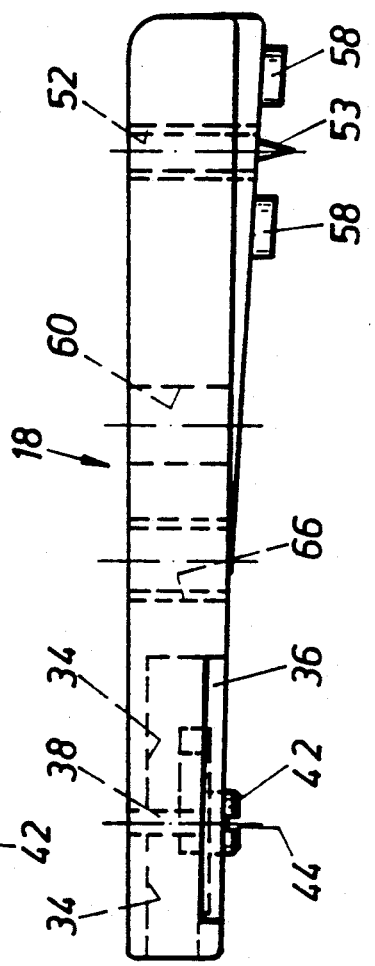
FIG. 5 is a view of the coupling arm as seen in the direction of the arrow 5 in FIG. 4.

In FIG. 6 the position of the locking cam 32 within the recess can be seen through the open mouth of the recess, and it is apparent that the shaft 38 runs transversely through the recess. The shaft serves not only as a pivot for the locking cam 32, but also forms part of a catch device which at first loosely holds the drawer front when the tongue is inserted into the recess in the coupling arm before being fastened by means of the locking cam 32. That is to say, when the tongue 24 is inserted, the slot 26 is pushed over the shaft 38, and at first the section 26a of the longitudinal slot 26, which is narrower that the diameter of shaft 38, is expanded with the resilient flexing of the tongue sections 28a and 28b, until the shaft passes into the wider section 26b of the slot. The tongue sections then snap back and the shaft 38 is caught in portion 26b of the longitudinal slot 26. The actual tight connection is then made by turning the locking cam 32 such that is locking surface 50 hooks around the lock engagement surfaces 30c, 30d, of the partial projections 30a, 30b, of the tongue. The spiral or eccentric curvature of the locking surface 50 thus pulls the tongue into the recess, i.e., the front facing provided on the mounting member 16 is drawn tightly against the corresponding drawer side 14.

In the narrow central and rear portions a total of 3 bores offset from one another are provided in the coupling arm 18 and serve for adjusting and fixing the coupling arm in three coordinate directions. The bore provided in the area of the rear end of the coupling arm is a threaded bore 52 into which the threaded body of a screw 54 can be driven. The threaded body of this screw passes through a slot 56 provided in a hollow chamber of a structural shape (or the wall of a housing, as the case may be) forming the drawer side 14, so that by tightening the externally accessible head of the screw 54 the coupling arm 18 can be tightened into clamping contact against the inner walls of the structural shape laterally adjoining the slot (or the inside surfaces of a housing). A vertical rib 53 projecting on both sides of the threaded bore 52 and having a free edge configured as a cutting edge can dig slightly into the material of the wall adjoining the slot 56 and thus constitutes a means of preventing longitudinal displacement of the coupling arm 18 when the screw 54 is tightened.

Therefore, by tightening the screw 54, the coupling arm 18 which is displaceable in the slot 56 when the screw is loosened is locked in place. Projections 58 extending one on either side of the threaded bore 52 from the slotted flat side of the coupling arm 18 additionally engage with clearance in the slot 56 and thus constitute abutments limiting to a given amount the tilting of the coupling arm about the axis of the screw, and in addition secure the threaded body of the screw 54 against damage to its threads when it is shifted in the slot.

In the middle part of the coupling arm 18 the second, cylindrical bore 60 passes through it, in which a complementary cylindrical cam 62 is journaled. From the end of cam 62 facing the slot a pivot 64 projects, whose longitudinal central axis is offset by the amount a from the center of the longitudinal central axis of the cam 62. The diameter of the pivot corresponds approximately to the width of the slot 56, i.e., the pivot is supported on the walls of the structural shape (or housing) adjacent the slot. By turning the pivot 64 provided with a screwdriver slot in its free end surface, therefore, the cam 62 journaled in bore 60 in simultaneously turned, and due to the excentricity a, however, the result is that the coupling arm will be swung upward or downward, and thus the front facing can be adjusted vertically.

The third bore, again in the form of a threaded bore 66, contains a threaded spindle 68 whose diameter is greater than the width of the slot 56 and whose length is made such that its opposite ends thrust against the inner surfaces of the structural shape forming the drawer side (or of the corresponding housing). In the end of the threaded spindle that can be seen through the slot 56 a cross slot 70 is accessible for engagement by a cross-point screwdriver. The threaded spindle 68 is displaceable lengthwise thrusting its ends against the opposite inside walls. By rotating the threaded spindle, therefore, the coupling arm is positively shifted in the horizontal transverse direction, such an adjustment being possible even with the screw 54 tightened, if the coupling arm 18 is manufactured of sufficiently elastic plastic.

In FIG. 10 the hollow structural shape used in this special case as a drawer side 14 indicated in broken lines in FIG. 1, is illustrated as it is seen from the front facing that is to be fastened. It can be seen that the cross section of the structural shape is made such that the slot 56 permitting adjustment of the coupling arm 18 is formed in a separate, channel-like inside portion provided in the interior of the structural shape, so that the head of the screw 54 and the pivot 64 of the cam 62 do not protrude above the visible inside surface of the drawer side 14. The slot 74 provided in the adjustment range in alignment with the slot 56 in the actual inner wall therefore serves only to permit access for the adjusting tools to the head of the screw 54, the pivot 64 and the cross slot 70 of the threaded spindle 68 for the adjustment or tightening of the coupling arm 18. After the adjustment and tightening of the coupling arm 18 have been performed, the slot 74 can be closed with a cover (not shown) which can be snapped into it, so that the mounting device for the front facing will be completely covered in the assembled drawer. In FIG. 11 is shown a view of the open end of the hollow structural shape with the coupling arm 18 inserted, showing the position of the coupling arm within the hollow structural shape. Only for the sake of completeness is the fastening of the bottom 76 (represented in broken lines) indicated, and it can also be seen from the figure in the drawing that a space open at the bottom is formed under the actual hollow chamber between the inner and outer walls of the structural shape, which can serve to accommodate the runner rail of the corresponding drawer slide.

Figure 12:
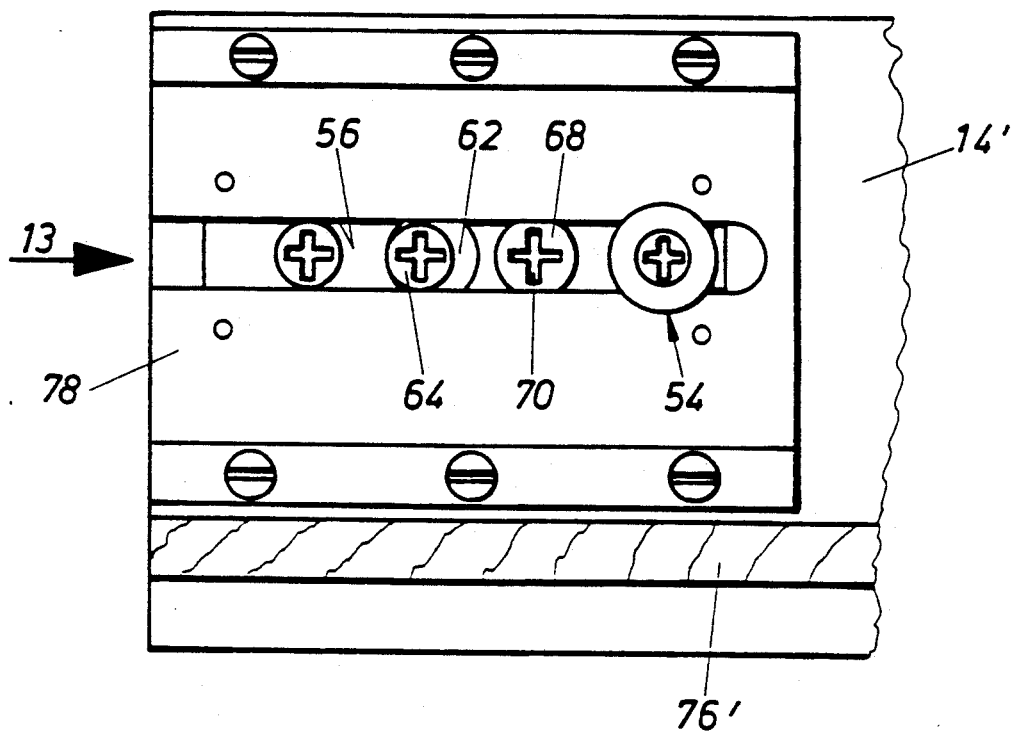
FIG. 12 is a top view of a variant embodiment of the invention, in which the coupling arm is disposed in a housing screwed onto the inner surface of a wooden drawer side.
Figure 13:
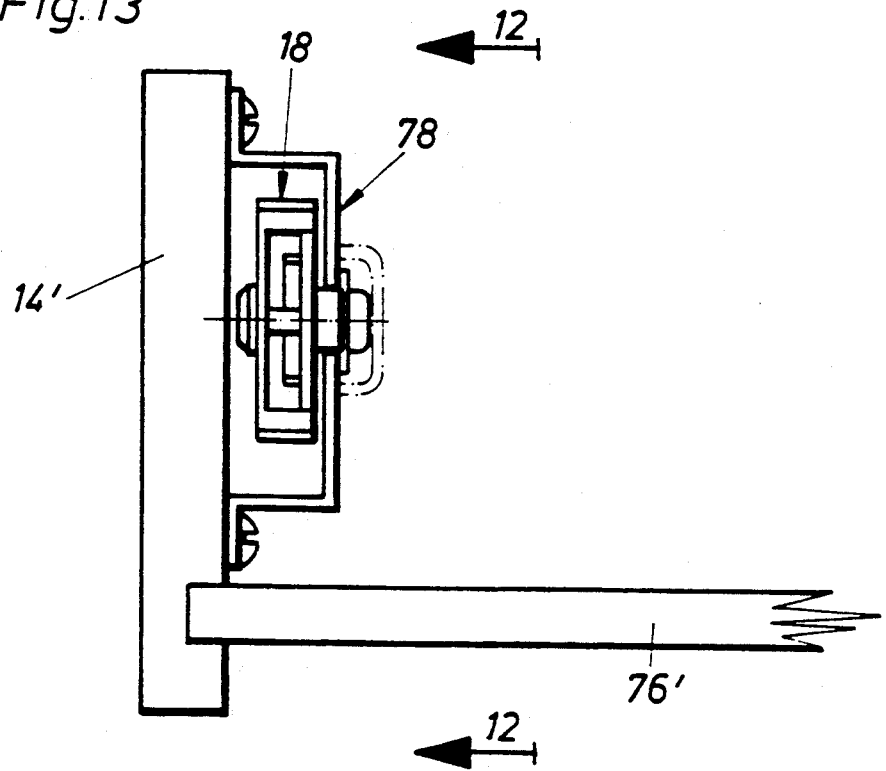
FIG. 13 is a view seen in the direction of arrow 13 in FIG. 12.

In FIGS. 12 and 13 is shown the arrangement 18 in a separate metal (in the case illustrated) housing box 78 screwed onto the inner face of a wooden drawer side 14'. It is clear that such a housing 78 can, of course, alternatively be recessed flush with the inner surface of the drawer side 14' in a recess milled in the drawer side. If the drawer side 14 is sufficiently thick, a configuration is also possible in which the recess is milled from one end of the drawer side 14', so that the housing 78 then completely disappears into the drawer side and only a slot, which even in this case is to be provided to correspond to the slot 74 in the hollow structural shape as shown in FIGS. 10 and 11, is visible in the inside face of the drawer but again can be closed by a cover which can be snapped in place.

It can be seen that modifications and further developments of the above-described front facing mounting device 10 can be realized, relating, for example, to additional modifications of the housing box 78 on single-walled shaped metal drawer sides or the location of the bore 60 for the cam 62, as well as the threaded bore 66 for the threaded spindle 68 in the coupling arm. It is important only that the two last-mentioned bores be disposed at a horizontal distance from the threaded bore 52 for the screw 54, so that, when the cam 62 or spindle 68 is rotated a leverage will be obtained with respect to the screw, and the rotational movement will be converted to corresponding up and down or transverse movement of the coupling arm 18. The coupling arm can also be disposed on the outside surface of the drawer side if sufficient space is available for it between this drawer side and the cabinet wall. In the case of appropriately configured single-wall drawer sides of metal, such an arrangement is conceivable, in which case the coupling arm can be fastened adjustably directly on the drawer side, i.e., without a supporting housing corresponding to housing 78. For appearance's sake, a covering will then be desirable for the fastening area of the coupling arm. Since this cover, however, serves no supporting function it can be made cheaply from plastic.

I claim:

1. A hardware device for fastening a front facing of a drawer to a side of the drawer, comprising:
a fastening part having a flange to be attached to the front facing and a tongue projecting substantially at right angles to the flange; and a mounting part in the form of an elongated relatively flat coupling arm to be mounted at the drawer side substantially parallel thereto, and having a recess for receiving said tongue, said tongue having a free end insertable into said recess and cooperating releasable fastening means on said tongue and in said recess for joining said tongue selectively to said coupling arm, and an open-ended longitudinal slot dividing the tongue into two resilient tongue sections, said fastening means comprising a shaft receivable within said slot between said tongue sections.

2. A hardware device according to claim 1, wherein the longitudinal slot has a mouth area with a width that is smaller than the diameter of the shaft and, adjoining the mouth area an area of a width which corresponds substantially to the diameter of the shaft.

3. A hardware device according to claim 1, wherein the shaft is journaled in bores in opposite walls of the coupling arm defining the recess, at least one of the bores being a throughbore through which the shaft is accessible for a turning tool, the shaft in the recess having a locking cam with an arcuate locking surface running spirally or eccentrically with respect to the axis of rotation of the shaft, and a lock engaging surface on the tongue with which the locking surface of the locking cam is engageable by turning the shaft with the tool.

4. A hardware device according to claim 3, wherein the locking cam has a base plate disposed at right angles to the axis of rotation of the shaft, journaled within the recess laterally beside the inserted tongue, and joined to the shaft for co-rotation therewith, a bolster projecting from a marginal area of the plate on the side facing the tongue, said bolster being arcuately curved in plan and extending over a portion of the circumference thereof and a boundary surface of which facing the shaft forms the locking surface, the lock engaging surface being formed by an outer boundary surface of a projection extending toward the base plate.

5. A hardware device according to claim 1, wherein in an end area of the coupling arm, remote from the recess means, for releasably fixing the coupling arm to an associated drawer side at selectable intervals are provided.

6. A hardware device according to claim 5, wherein said fixing means comprises a first, transversely disposed threaded bore into which a mounting screw is screwed having a shaft passing through a slot in the wall of the drawer side.

7. A hardware device according to claim 5, wherein said fixing means comprises a first, transversely disposed threaded bore into which a mounting screw is screwed having a shaft passing through a slot in a wall in a hardware housing which accommodates the coupling arm and is fastenable at the drawer side.

8. A hardware device according to claim 6 or 7, wherein on opposite sides of the first, threaded bore a rib, each running substantially at right angles to the length of the coupling arm, projects from a flat side of the coupling arm facing the wall with the slot, each rib having a free edge facing the wall and sharpened like a knife edge.

9. A hardware device according to claim 8, wherein at least one projection extends from the flat side of the coupling arm facing the slot, adjacent the first, transverse threaded bore, and its width measured transversely of the projection is slight smaller than the slot width.

10. A hardware device according the claim 6 or 7, wherein said fixing means comprises a second bore, of circular cross section and passing through the coupling arm in a central area thereof, a cam journaled in said second bore and having an end facing the slot, from which projects a pivot passing through the slot, said pivot having a diameter corresponding approximately to the width of the slot and an axis of rotation which is parallel to the central axis of the cam, but is offset by the amount of eccentricity from the central axis of the cam.

11. A hardware device according to claim 10, wherein the pivot has a free end with a configuration permitting engagement by a turning tool.

12. A hardware device according to claim 10, wherein said fixing means comprises in a central area of the coupling arm a third, threaded transverse bore passing through the coupling arm, the diameter of the third bore being greater than the width of the slot, a threaded spindle screwed into the third, threaded transverse bore and having a length approximately equal to the free distance between the wall, the threaded spindle having an end facing the slot with a tool engaging recess accessible through the slot.

* * * * *